United States Patent [19]

Beardmore

[11] 4,158,328
[45] Jun. 19, 1979

[54] PISTON WITH VARIABLE SIDE CLEARANCE

[75] Inventor: John M. Beardmore, South Lyon, Mich.

[73] Assignee: General Motors Corporation, Detroit, Mich.

[21] Appl. No.: 835,903

[22] Filed: Sep. 23, 1977

[51] Int. Cl.² ............................................. F16J 1/04
[52] U.S. Cl. .................................. 92/212; 92/203; 123/193 CP
[58] Field of Search ............... 92/207, 203, 212, 216, 92/237, 126; 123/193 P, 193 CP; 277/25, 168, 177, 190, 191

[56] References Cited

U.S. PATENT DOCUMENTS

| | | | |
|---|---|---|---|
| 1,422,729 | 7/1922 | Waterhouse | 92/203 X |
| 2,386,873 | 10/1945 | Mercier | 277/177 X |
| 2,862,475 | 12/1958 | Kinsman | 277/177 X |
| 3,906,923 | 9/1975 | Harker | 123/193 P |
| 3,913,885 | 10/1975 | Greenwood et al. | 92/207 X |
| 4,079,948 | 3/1978 | Paureau | 277/27 |

FOREIGN PATENT DOCUMENTS 374090 4/1907 France .................................. 123/193 P

*Primary Examiner*—Irwin C. Cohen
*Attorney, Agent, or Firm*—Robert J. Outland

[57] ABSTRACT

A piston having a floating wedge carried in a recess of the skirt for limited axial movement. Reciprocation of the piston shifts the wedge position between upper and lower extremes, reducing the effective piston clearance in its cylinder during the upper portions of its stroke, thus reducing lateral piston motion and resulting piston slap caused noise.

4 Claims, 5 Drawing Figures

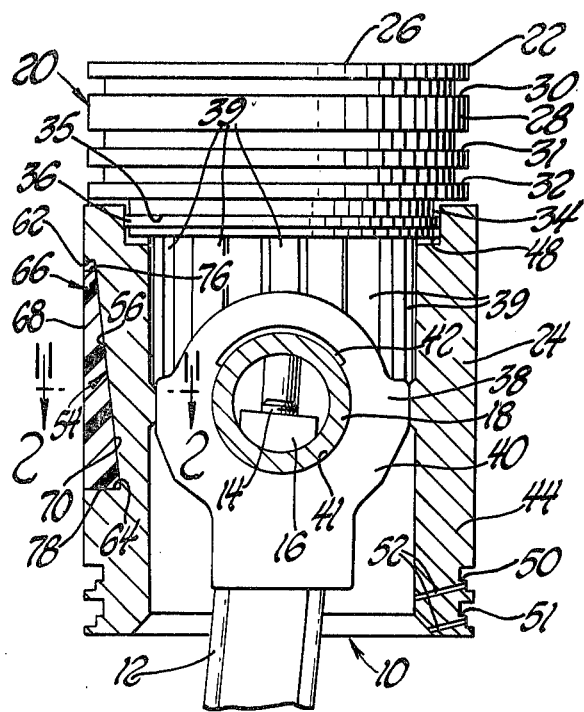

PISTON WITH VARIABLE SIDE CLEARANCE

This invention relates to pistons for internal combustion engines and, more particularly, to pistons having clearance take up means for reducing lateral motion and the resultant noise of piston slap.

It is known in the art relating to reciprocating piston internal combustion engines with conventional crank output mechanisms that some of the noise resulting from the operation of such engines may be attributable to so-called piston slap caused by the lateral shifting of a piston from engagement of its skirt with one side of an associated cylinder to engagement with the other side of the cylinder. Such lateral movement may result from the constantly changing angle of the connecting rod and crank mechanism which results in shifting of the piston, near the top dead center position and under its loaded condition, through a lateral distance permitted by the amount of clearance between the piston skirt and the cylinder. The rapid shifting of the piston under loaded conditions causes the skirt to strike the opposite cylinder wall with sufficient force to, in some cases, generate noise in the cylinder block. The amount of this force and the resulting noise obviously depends, to a great extent, on the amount of clearance between the piston and cylinder as well as on the instantaneous gas pressures applied to the piston. Since combustion gas pressures are generally higher in diesel engines, the resulting piston slap noise may be more severe in such engines. Control of the problem by minimizing piston to cylinder clearance is limited by the need for free running and lubrication of the piston skirt, for which purposes a certain amount of clearance is needed.

The present invention provides means associated with a piston skirt for varying the clearance between the skirt and its associated cylinder in a way which minimizes the lateral piston motion under gas loaded conditions and reduces resultant piston slap noise. This is accomplished by providing an axially movable wedge member carried in a recess of the piston skirt at one of the locations of piston thrust loading. The wedge is shifted axially by its own inertia due to the reciprocating motion of the piston. It is arranged to shift its surface outwardly in the upper portions of piston motion, near the top dead center position, so as to reduce the effective piston to cylinder clearance. This limits the possible lateral piston motion under load and thereby reduces the resulting shock load and piston slap noise.

In a preferred embodiment, a wedge of polytetraflouroethylene (Teflon) material is received in an angled recess of an aluminum piston skirt applied to a diesel engine crosshead type piston. The wedge and its associated recess are dimensioned so that the outer surface of the wedge is approximately coplanar with that of the piston skirt when the wedge is in its lower, recessed, position. However, when inertia shifts the wedge to the upper portion of its recess, the wedge outer surface moves outwardly from the remaining piston skirt surface so as to take up a predetermined portion of the cylinder-to-piston skirt clearance for the purposes previously mentioned.

Numerous variations in the possible configuration and application of the invention are recognized as possible. These include the use of one or more than one wedge on one or both of the loaded sides of the piston, the use of differing materials and wedge angles, the use of plural rather than singular wedge surfaces, the application of the invention in various types of engine pistons, etc. These and other variations which may be possible within the scope of the inventive concepts disclosed are intended to be encompassed within the breadth of this disclosure.

These and other objects and features of the present invention will be more fully understood from the following description of a preferred embodiment taken together with the accompanying drawing in which FIG. 1 is a transverse cross-sectional view through portions of a piston-connecting rod assembly having variable side clearance means according to the invention;

FIG. 2 is a fragmentary cross-sectional view through a portion of the skirt of the piston of FIG. 1 taken generally along the line 2—2 of FIG. 1 as viewed in the direction of the arrows;

FIG. 3 is an exploded pictorial view of the skirt member of FIGS. 1 and 2 ill strating particularly the form of the recess and associated wedge member; and FIGS. 4 and 5 are partial cross-sectional views showing a piston assembly as installed in an engine cylinder and indicating the manner in which the variable side clearance device functions during engine operation.

Referring now to the drawings in detail, FIG. 1 illustrates a piston-connecting rod assembly generally indicated by numeral 10. In its construction details, the piston connecting rod assembly 10, except for the skirt portion to be discussed subsequently, is essentially like the crosshead piston assemblies disclosed in U.S. Pat. Nos. 3,995,538 Beardmore and Bennett and 3,555,972 Hulsing, both of which are assigned to the assignee of the present invention. Since these similar construction details are well disclosed in these prior patents and do not make up any of the novel features of the present invention, some of these details have been omitted from the drawings for simplicity and reference may be made to the indicated patents for a complete understanding of this construction.

Assembly 10 includes a connecting rod 12 which is secured as by bolt and nut means 14, 16, respectively, to a hollow cylindrical piston pin 18 which extends transversely of the assembly, and supports a multi-piece piston generally indicated by numeral 20. Piston 20 includes two primary elements—a head member 22 and a skirt, or crosshead, member 24. The construction of the piston head member 22 is similar to those disclosed in the previously mentioned U.S. Pat. Nos. 3,995,538 and 3,555,972. This member 22 includes a crown section 26 which closes the upper end of the piston and forms a combustion chamber defining wall against which the working gas forces in an associated engine cylinder are applied. Depending from the outer edge of the crown section is an annular ring belt section 28 in which are formed three grooves 30, 31, 32 for receiving conventional piston compression rings, not shown. Below the third ring grooves 32, the ring belt section terminates in a reduced diameter portion 34 which includes an annular ring groove 35 containing a seal ring 36.

The piston head member further includes a piston pin connecting section 38 connected to the crown section by columns 39 and having depending arms 40 with openings 41 in which the piston pin 18 is oscillatably received. A bearing insert 42 is also carried in section 38 and extends along a major portion of the upper surface of the piston pin 18 to carry the gas loads applied to the piston head member directly to the piston pin and thence to the connecting rod.

The skirt or crosshead member 24, as illustrated in FIGS. 1–3, comprises generally a cylindrical wall 44 having a pair of oppositely disposed cylindrical pin receiving openings 46. Into these openings, the ends of the piston pin 18 extend for the purposes of holding the skirt member in assembly with the piston head member and connecting rod and of transferring thrust loads applied to the piston skirt member directly to the piston pin separately from the head member. The interior of the skirt extends closely but freely around the depending arms 40 of the piston head member and its upper end is counterbored to form an annular shoulder or wall portion 48 which surrounds the reduced diameter portion 34 of the piston head member and is engaged by the seal ring 36 for the purpose of restricting the escape of cooling oil from the interior of the piston, while permitting slight relative oscillatory motion of the piston head and skirt members around the piston pin.

At its lower end, the skirt member includes two oil ring grooves 50, 51 which provide for the application of suitable oil scraper rings for controlling the amount of oil on the engine cylinder walls. Below each groove are a plurality of oil drain passages 52 to carry oil away from the oil rings in a conventional manner.

It is noted that the side thrust loads on a piston in an engine having the usual crank and connecting rod mechanism are centered at laterally opposite points of the piston skirt on either side of and laterally aligned with the axis of the piston pin. For this reason, the piston skirt extends above and below the level of the piston pin sufficiently to provide adequate bearing surface on either side of the pin axis to carry the expected side thrust loads.

Side thrust loads vary during engine operation and are related directly to the instantaneous combustion gas and inertia forces acting axially along the line of piston motion and to the instantaneous angle by which the connecting rod deviates from its axially aligned top and bottom dead center positions. Thus, the greatest side thrust loads usually occur during the early portions of the piston working or expansion stroke, when high combustion gas forces are present and the connecting rod angle is increasing. Not surprisingly, the second highest side thrust loads usually occur late in the compression stroke.

The side of the piston skirt which is urged into engagement with its associated cylinder wall during the expansion stroke thus usually has the highest side thrust forces applied to and through it and for this reason, it is commonly known as the thrust side of the piston or skirt. The opposite side of the piston from the thrust side is subject to the second highest thrust forces, which occur during the compression stroke, but during the expansion stroke this side of the piston is completely unloaded. Therefore, it is commonly known as the anti-thrust side.

In the normal operation of an engine piston, as the piston reaches a point at or near its top dead center position, the direction of side thrust force on the piston reverses and the piston moves laterally from a position of engagement of is anti-thrust side with the cylinder wall to an opposite position wherein its thrust side engages the opposite side of the cylinder wall. This lateral motion occurs quickly and over the distance permitted by the clearance provided between the piston skirt and the associated cylinder. Such clearance is needed in order to provide adequate space for lubricating oil to enter between the piston and cylinder walls and to provide for adequate running clearance under all the various engine temperature and operating conditions. In some engines, and particularly in diesel engines where high gas forces are present, the lateral changeover motion and resulting engagement of the piston with the cylinder wall can apply a substantial shock loading to the cylinder wall and result in an audible noise which is known as piston slap. The amount of the shock force and the resulting piston slap could, of course, be reduced by reducing piston clearance. However, this clearance is, in most engines, kept at the minimum possible in view of the other requirements, and yet the phenomena of piston slap may still occur.

The present invention provides means by which the effective piston to cylinder clearance may be reduced during those portions of the piston operating cycle when piston slap occurs and thus provides means for reducing both the shcok loading and the resultant noise of piston slap. In the preferred embodiment shown in FIGS. 1–3, the slap reducing means consist of an outwardly opening recess 54 provided on the thrust side of the piston skirt and disposed around the center of thrust loading. Recess 54 has inner side or wall 56 which is preferably cylindrical, but is angled with respect to the outer skirt surface so that the inner side tapers outwardly as it approaches the upper end of the piston skirt, which is closed by the head member. At its borders, the recess terminates in radially and longitudinally extending side walls 58, 60 and in laterally directed upper and lower end walls 62, 64, respectively. Because of the taper of the inner side 56, the upper end wall 62 is shorter than the lower end wall 64.

Associated with and mountable within recess 54 is a floating wedge or sliding bearing block member 66. Wedge member 66 is formed with an outer surface 68, a tapered inner surface 70, a pair of circumferentially spaced side walls 72, 74 and a pair of axially spaced end walls 76, 78. The inner surface 70 is shaped to conform to the inner side 56 of the recess 70 and has a similar configuration, preferably cylindrical, formed at an angle to the outer surface. The outer surface 68 is formed to the same generally cylindrical shape as that of the adjacent piston skirt. The lower end wall 78 has a length essentially the same as lower end wall 64 of the recess 54. Thus, when the wedge member 66 is in its lower position, with its inner side and lower wall engaging their respective portions of the recess as shown in FIGS. 1 and 5, the outer surface 68 of the wedge member forms essentially an extension of the piston skirt outer surface so as to accept thrust loads along with the adjacent portions of the piston skirt extending longitudinally and circumferentially beyond the wedge member.

The axial length of wedge member 66 is made shorter than that of the recess by a predetermined amount so that the wedge may be permitted to move upwardly from its lower position in the recess to a point as shown in FIG. 4 wherein its upper end wall 76 approaches or engages the upper end wall 62 of the recess. As this movement occurs, the co-action of the tapered inner walls of the recess and wedge member force the wedge member outwardly, causing the wedge outer surface 68 to extend radially beyond the adjacent portions of the piston skirt and to in essence increase the effective diameter of the skirt. Preferably, the amount of longitudinal wedge motion permitted is such as to permit the outward motion of the wedge to take up all, or nearly all, the clearance between the piston skirt and its associated cylinder when the member is in its furthest upward position.

The operation of this construction is shown in FIGS. 4 and 5 of the drawings. As the piston moves upwardly on its compression stroke, motion and acceleration are both in an upward direction until the piston passes a point slightly more than halfway through its stroke where the piston begins to slow down and its acceleration changes to a downward direction. This point will vary somewhat with the relative lengths of the crank throw and connecting rod, but may approximate a position about 70 degrees before top dead center. At or after this point, the downward acceleration of the piston will become great enough that the wedge member 66 will be forced into its upward position, as shown in FIG. 4, by its own inertia. The wedge member remains in this upward position until the acceleration again changes direction part way through the piston expansion stroke. In this position, the wedge member takes up all or most of the piston clearance in its associated cylinder, indicated by numeral 80. Thus, when the piston reaches top dead center, the change in thrust loading from the anti-thrust to the thrust side does not result in substantial lateral motion of the piston and there is thus no significant shock loading or piston slap noise.

As the piston then moves downwardly on the expansion stroke past a point which may be about 70 degrees after top dead center, the piston acceleration again changes direction and turns upward as the piston begins to slow down. As this occurs, the inertia of the wedge member 66 forces it down to its lower position as shown in FIG. 5 wherein the wedge member moves fully into the skirt recess and the full clearance of the skirt within the cylinder is restored, permitting free running and lubrication of the piston skirt in the cylinder in the usual manner.

In the described embodiment, the separate skirt member is preferably made from aluminum, although it is recognized that many other suitable materials may be utilized. In like manner, the sliding wedge member may be formed of polytetraflouroethylene (Teflon) material or may be made of any other suitable material which has adequate wear, strength, and bearing performance characteristics. Tests showed that a wedge angle of six degrees between inner and outer surfaces provided satisfactory operation; but it is considered that other angles would also be suitable as long as the angle chosen is not so small as to cause self-locking of the wedge in the upper position or so large as to cause the wedge to be forced out of position by the side thrust forces.

While the preferred arrangement as shown places the wedge member and its associated recess on the thrust side of the piston skirt, it is considered within the scope of the invention to locate the wedge member instead on the anti-thrust side of the piston skirt or, alternatively, to provide more than one wedge member on either or both sides of the piston skirt. It should also be understood that the invention is not limited to use in multi-piece pistons of the type described, but is considered to have application to reciprocating engine pistons of substantially all types, whether the skirt is integral with the head member or separate therefrom.

Other possible design variations include varying the thickness of the wedge member so that, in its lower position, it either is recessed in the skirt or protrudes out of the skirt instead of forming an extension of the skirt wall as in the illustrated embodiment. Also, the wedge member may be made to take up all the piston-cylinder clearance before it reaches the top of the recess. In this case, the amount of possible upward movement remaining, provides for some cylinder and piston wear and an allowance for manufacturing tolerances within which consistant operation of the mechanism to provide the same no-clearance condition is possible. For various reasons, however, it may be necessary or desirable to provide some finite clearance in the reduced clearance mode of operation with the wedge in its furthest upward position.

These and other changes which may be made within the scope of the inventive concepts disclosed are intended to be encompassed within the invention, the limits of which are to be defined only by the language of the following claims.

What is claimed is:

1. A variable side clearance engine piston capable of reducing piston slap noise by reducing the piston side clearance in an associated cylinder near the top dead center position of piston movement, said piston having
   a closed end
   pin bearing means spaced axially from the closed end for connecting the piston in load transmitting relation to a connecting rod for oscillation on a transverse axis with respect to the rod,
   a skirt having generally part-cylindrical cylinder engaging portions disposed on laterally opposite sides of said transverse axis to carry major and minor thrust loads imposed on the piston, one of said cylinder engaging portions having an outwardly opening recess of less than semi-cylindrical circumferential extent and with an inner side tapered outwardly in the direction of the closed end to provide reduced recess depth toward the closed end, and
   a floating wedge insert loosely retained in the recess, said insert having a tapered surface engaging the recess inner side and a part-cylindrical cylinder engagable surface opposite its tapered surface and parallel with the adjoining portion of the skirt, said wedge having a circumferential extent not greater than the recess and an axial length substantially less than that of the recess to permit in operation inertia caused axial movement of said wedge in said recess between first and second positions, respectively closer to and further from said piston closed end, said floating wedge having a thickness at its thinner end greater than the depth of said recess at its shallower end, whereby movement of the wedge toward the piston closed end due to opposite piston acceleration reduces the piston side clearance along the line of side thrust loading, thereby reducing piston slap motion at the end of respective piston strokes, while opposite movement of the wedge due to opposite piston acceleration increases the side clearance to promote skirt lubrication and free running.

2. A piston according to claim 1 wherein said floating wedge has a thickness at its thicker end not greater than the depth of the recess at its deeper end, so that movement of the floating wedge to the end of the recess farthest from the piston closed end increases the side clearance to that determined by the diameter of the piston skirt.

3. An internal combustion engine piston reciprocable on an axis and having a head end and a cylinder engagable skirt axially spaced therefrom and adapted to carry side thrust loads centered at diametrically opposite positions of said skirt, and the improvement comprising:

a sliding bearing block member having a cylinder engagable outer surface and carried in a recess of the skirt located at one of said opposite positions and of less than semi-cylindrical extent, said recess having a sloping floor and being shallower toward the piston head end with axially spaced stops at both ends, said block having a sloping surface engaging said sloping floor, said block being substantially shorter than and slidable in said recess axially of the piston between said stops and having a thickness sufficient to protrude beyond the adjacent skirt portions at least when positioned toward the shallower end of the recess, so that alternating inertia forces caused by reciprocating movement of the piston on its axis cause reciprocation of the bearing block in the recess, thereby changing the effective diameter of the piston at the positions of thrust load application, to reduce clearance of the piston in an associated cylinder when near the ends of its strokes in the direction of the piston head so as to reduce the amount of lateral piston motion and resultant piston slap noise due to thrust load reversals near such piston stroke ends.

4. A piston according to claim 3 wherein said sliding block and its associated recess are disposed on the major thrust side of the piston.

* * * * *